Aug. 20, 1935.  C. A. CAMPBELL  2,011,751
AIR BRAKE
Filed March 24, 1933  4 Sheets-Sheet 1

Inventor
Charles A. Campbell
By
Dodge and Son
Attorneys

Aug. 20, 1935.   C. A. CAMPBELL   2,011,751
AIR BRAKE
Filed March 24, 1933   4 Sheets-Sheet 2
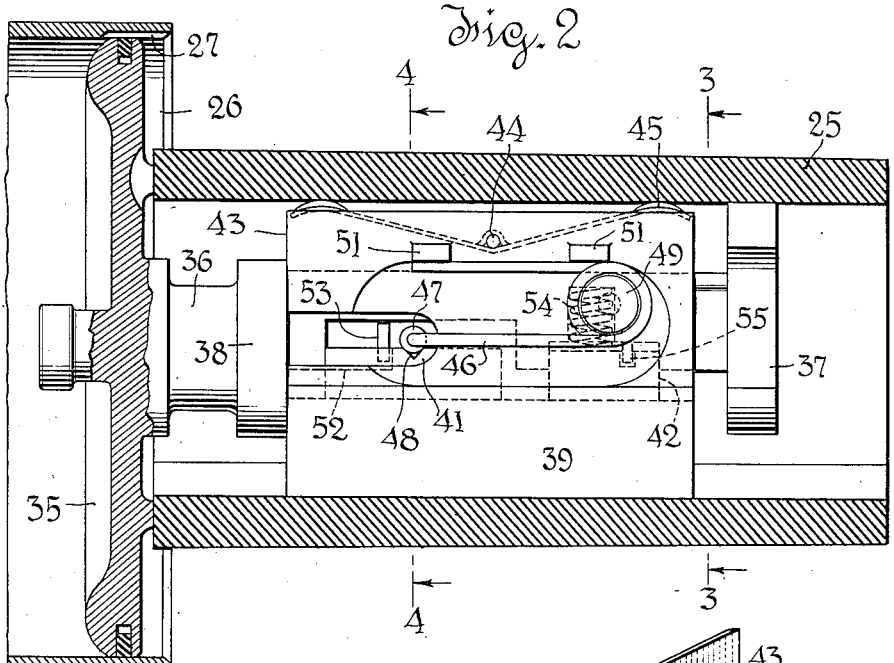
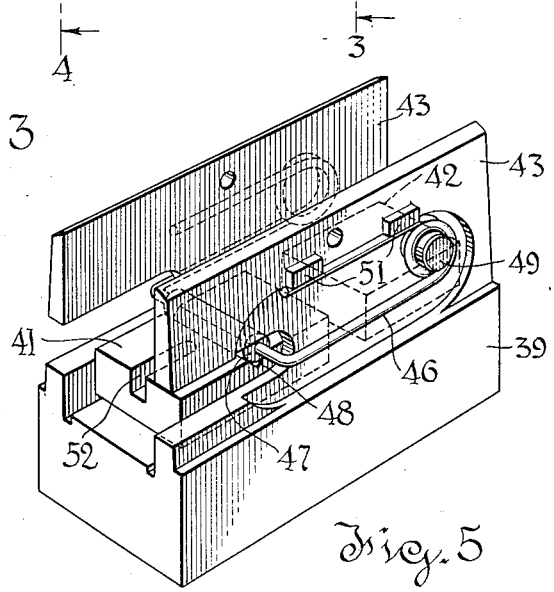
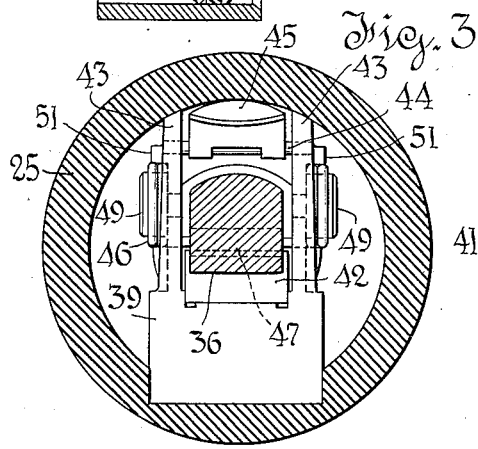
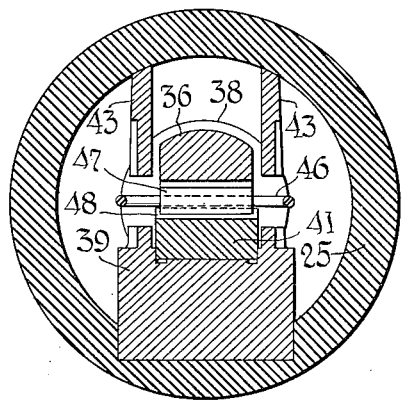
Inventor
Charles A. Campbell
By Dodge and Son
Attorneys

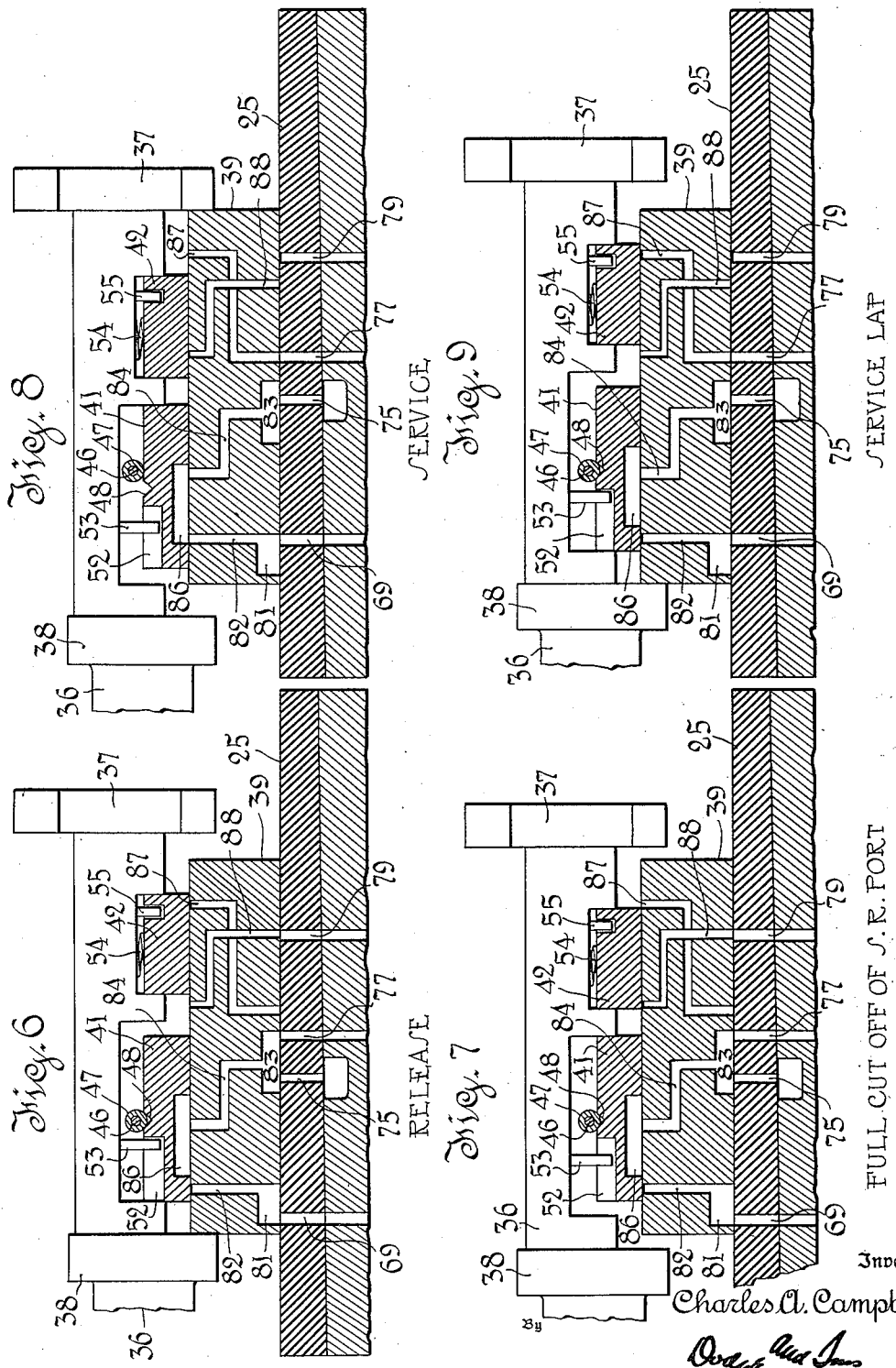

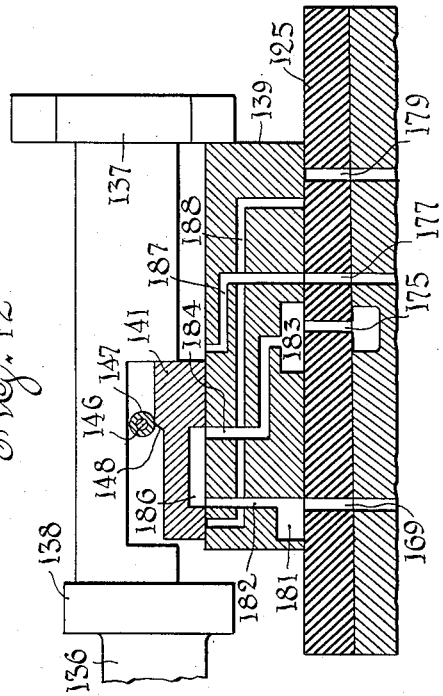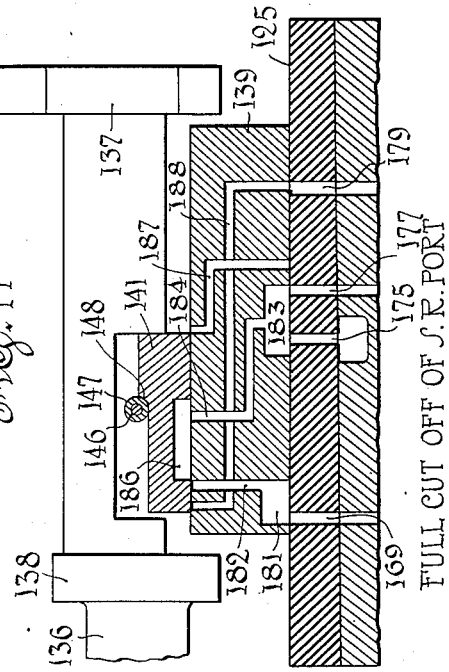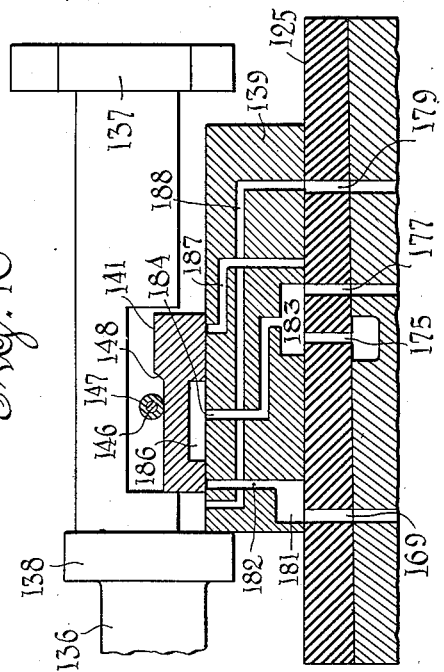

Patented Aug. 20, 1935

2,011,751

UNITED STATES PATENT OFFICE 2,011,751

AIR BRAKE

Charles A. Campbell, Watertown, N. Y., assignor to The New York Air Brake Company, a corporation of New Jersey Application March 24, 1933, Serial No. 662,628

31 Claims. (Cl. 303—41)

This invention relates to triple valves, and particularly to means for controlling the motion of the graduating valve relatively to the slide valve.

The invention contemplates the use of an impositive detent or similar device adapted to offer pronounced resistance to relative motion of the valves at a definite point or points in such relative motion, and little or no resistance at other points.

The invention is generally applicable and may be used to time or control a variety of functional movements of the graduating valve relatively to the slide valve. It may be used with a number of different arrangements of the graduating valve. For example, it may be used when a single graduating valve operates in conjunction with a single slide valve. Equally it may be used when more than one graduating valve operates in conjunction with a single slide valve, and, for purposes of explanation, I shall illustrate an arrangement in which one of such dual graduating valves performs a quick service controlling function, and the other performs the normal graduating functions.

In this embodiment the invention is shown as applied to one field in which it has demonstrated peculiar utility, namely, in the control of the motion of a graduating valve or a quick service controlling valve of the type which produces quick service venting by the motion of the graduating valve or of the quick service controlling valve, as the case may be, prior to any motion of the main slide valve. A quick service control of this type is peculiarly sensitive, and the detent mechanism may be used in such a way as to preclude quick service action when this is not desired, and yet not preclude its occurrence when it is desired.

For purposes of illustration, I shall describe the mechanism arranged to perform two useful functions; one, to prevent the triple valve from shifting to quick service position from service lap position, and, two, to prevent the triple valve from shifting to quick service position immediately after release at the end of a long train, the tendency to such motion being produced by backflow from a supplemental reservoir which is connected with the auxiliary reservoir in release position.

Other possible uses for the invention will readily suggest themselves to those skilled in the art.

Two preferred embodiments of the invention are illustrated in the accompanying drawings, in which:—

Fig. 2 is a view partly in axial section and partly in elevation, showing the triple piston and slide valve in position in their respective bushings and indicating how the detent mechanism is supported on the slide valve.

Fig. 3 is a section on the line 3—3 of Fig. 2.

Fig. 4 is a section on the line 4—4 of Fig. 2.

Fig. 5 is a perspective view of the slide valve with the graduating valves and the detent mechanism in place.

Fig. 6 is a diagrammatic view on an enlarged scale, showing the slide valve and the two graduating valves in release position.

Fig. 7 is a similar view, showing the position assumed by the parts when the triple piston moves toward service position as a result of backflow from the supplemental reservoir to the auxiliary reservoir. This view shows how the triple piston is arrested by the impositive detent before the triple valve reaches quick service position.

Fig. 8 is a similar view showing the parts in service position. In this position the quick service ports are open and the detent has been overpowered.

Fig. 9 is a similar view, showing the parts in service lap position. In this position one of the graduating valves is latched impositively against motion to quick service position and serves as a limit stop which permits the other graduating valve to graduate service flow.

Fig. 10 is a diagrammatic view, similar to Fig. 6, but showing the application of the valve to a structure in which a single graduating valve is used. The parts are shown in release position.

Fig. 11 is a similar view showing how the triple piston is arrested by the impositive stop when it moves outward from release position as the result of back-flow from the supplemental reservoir. The piston is arrested after the supplemental reservoir port has been closed and before the quick service port has been opened.

Fig. 12 is a similar view showing the parts in service position in which the impositive detent has been overpowered and the quick service ports are open.

Fig. 13 is a similar view showing service lap position.

Figure 1:
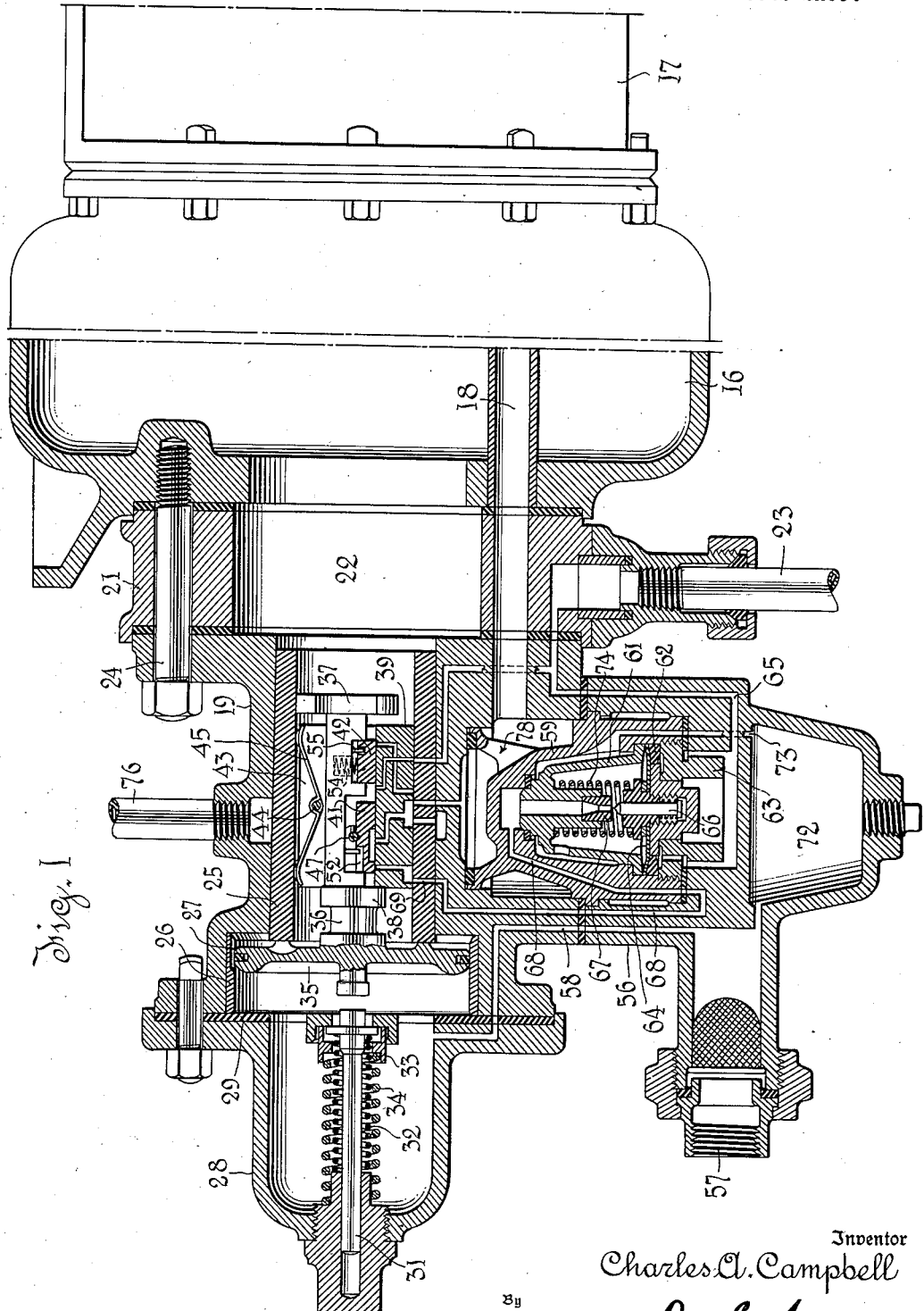
Fig. 1 is a vertical, axial section through a triple valve embodying the invention, the triple valve being shown with connections to an auxiliary and a supplemental reservoir and the brake cylinder. The valve is shown in release position.

Referring first to Fig. 1, the auxiliary reservoir is illustrated at 16. It is of the freight type, and carries a brake cylinder 17 mounted on its forward end and connected with the triple valve by a brake cylinder pipe 18 which extends through the reservoir.

Between the reservoir 16 and the body 19 of the triple valve there is interposed a filler piece 21 having a through passage 22 which affords connection between the auxiliary reservoir and the slide valve chamber of the triple valve. The filler piece is also formed with a through port which forms a continuation of the brake cylinder pipe 18, as clearly shown in the drawings. The filler piece 21 is also provided with a connection for a pipe 23 leading to a supplemental reservoir of ordinary form, not shown on the drawings. Suitable gaskets are interposed between the reservoir, filler piece and triple valve body, and the parts are connected by studs, one of which is shown at 24 in the drawings.

The body 19 is provided with the usual slide valve chamber bushing 25 and cylinder bushing 26, the latter having the usual charging groove 27. Attached to the body is the usual front cap 28 which seats on the front cap gasket 29 of ordinary form. The front cap is provided with a graduating stem 31 which is urged inward by a light graduating spring 32. When forced outward slightly, it picks up a collar 33 which is urged inward by a second and heavier graduating spring 34. The effect is to cause both springs to resist motion of the triple piston to emergency position.

The triple piston is indicated at 35 and has a stem 36 guided at its inner end by a spider 37. Between the spider 37 and collar 38 is confined a slide valve 39. This slide valve is allowed substantial lost motion with reference to the stem 36.

Mounted on the back of the slide valve 39 are two graduating valves 41 and 42. The valve 41 will be referred to hereinafter as the quick service controlling valve, because it exercises primary control of the quick service function, and the valve 42 will be called the graduating valve, because it includes among its functions that of graduating service flow. The valve 41 has lost motion relatively to stem 36, the range of lost motion being less than that of the valve 39. The valve 42 is closely confined in a notch in the stem 36 and partakes of all the motions of piston 35.

The slide valve 39 has upstanding wings 43 on its sides, and carried on a pin 44 extending between these wings is the usual bow spring 45 which urges the valve to its seat. The valve 41 is urged to its seat on the back of the slide valve 39 by means of a bail-like spring 46 carrying a roller 47 which runs on the back of the valve 41 and which, in a definite position of that valve, snaps into a transverse notch 48 formed in the back of the valve 41. The bail-like spring 46 is coiled around studs 49 formed on the outer faces of the wings 43 and its ends are held beneath lugs 51 also formed on the outer faces of the wings 43. The position of the groove 48 with respect to the porting of the valve will be explained fully after the porting has been described.

To insure proper assembly of the valve 41, it is provided on its back with a longitudinal slot 52 (see Fig. 5) which receives a positioning pin 53 (see Fig. 2). The pin moves freely in the slot and has no function beyond precluding improper assembly.

The valve 42 is held to its seat on top of the valve 39 by means of a coil compression spring 54 shown in dotted lines (see Fig. 2). Improper assembly is prevented by a positioning pin 55.

Bolted to the lower portion of body 19 with an intervening ported gasket is the lower case 56 to which the brake pipe is connected at 57. Port 58 leads to the space to the left of piston 35.

Mounted in a recess and clamped within the body 19 and the lower case 56 is a quick service limiting valve mechanism forming the subject matter of my application Serial Number 517,606, filed February 21, 1931, and consequently not claimed herein except in conjunction with the detent mechanism associated with the quick service controlling valve. This valve mechanism includes a supporting cage 59 whose form is shown in the drawings, the cage being sealed by means of gaskets in the recesses formed in the body and lower case.

Mounted in this cage is a member 61 which serves as a combined valve seat and diaphragm support. Clamped against this seat by a ring 62 and nut 63 is a flexible diaphragm 64 which is subject on its lower face to supplemental reservoir pressure arriving by way of port 65 which communicates with the supplemental reservoir connection 23. The diaphragm carries at its center a pin valve 66 which coacts with a seat 67. From the seat 67 there leads a port 68 formed in the cage 59, lower case 56 and body 19 and leading to the quick service port 69 in the slide valve seat.

The brake pipe connection 57 communicates with a drip cup 72 and from this there leads a port 73 which communicates with the space above the diaphragm 64. Consequently, the diaphragm is urged upward by supplemental reservoir pressure and is urged downward by brake pipe pressure. Loading spring 74 assists brake pipe pressure. The strength of this spring is so chosen that the valve 66 will close against its seat when brake pipe pressure is reduced a certain amount below supplemental reservoir pressure. Since the supplemental reservoir is not drawn upon in service applications, it follows that the quick service limiting valve 66 will close and prevent further quick service venting when brake pipe pressure has been reduced a definite amount.

The remaining ports in the seat for the slide valve comprise an exhaust port 75 which leads to the retainer pipes 76. To this pipe a retainer of ordinary form (not shown) is customarily applied, but its presence or absence is not material to this invention.

The brake cylinder port is shown at 77 and leads through a passage 78 in the cage 59 to the brake cylinder pipe 18 by way of alined passages formed in the body 19 and in the filler piece 21, as clearly shown in the drawings. The supplemental reservoir port in the seat of the slide valve is shown at 79.

The slide valve 39 is formed in its lower face with a cavity 81 which registers with the port 69 in release position and also in service and service lap positions. Leading from the cavity 81 to the seat for the quick service controlling valve 41 is a quick service port 82. Formed in the lower face of the slide valve 39 is an exhaust cavity 83 which, in release position, connects the ports 75 and 77. The cavity 83 registers with the exhaust port 75 in service and service lap positions, and a port 84 in the seat for the quick service controlling valve 41 communicates with the cavity 83.

The quick service controlling valve 41 has in its lower face a cavity 86 which bridges the ports 82 and 84 if the valve 41 be moved to the left (see service position, Fig. 8). In the right hand position of valve 41 relatively to the valve 39 this connection is interrupted, cavity 86 merely overlying the upper end of port 84. The groove 48 is so located that the roller 47 enters the groove and tends to retain the valve 41 in the last-named position.

The valve 39 has a service port 87 leading from the seat of valve 42 downward to the lower face of the valve 39. It is also provided with a supplemental reservoir port 88 which also leads from the seat of valve 42 to the lower face of valve 39.

The valve 42 is so dimensioned that it exposes the upper ends of ports 87 and 88 selectively when moved in opposite directions. The degrees of lost motion permitted to the slide valve 39 and the controlling valve 41 with respect to the stem 36 and graduating valve 42 are such that without motion of the controlling valve 41 the graduating valve 42 may move far enough to blank either of the ports 87 and 88. Consequently, the graduating functions of the valve 42 are carried out without entailing motion of the valve 41. However, if valve 41 is shifted, the additional motion of valve 42 performs no function. The function of the mechanism so far as the action of the detent is concerned will now be explained.

OPERATION

*Release and recharge position*

Release and recharge position is shown in Figs. 1 and 6. Cavity 83 bridges ports 75 and 77, exhausting the brake cylinder to atmosphere. The reservoir charging flow takes place through charging groove 27 to the slide valve chamber. Thence there is direct flow to the auxiliary reservoir and flow by way of ports 88 and 79 to the supplemental reservoir.

Remembering that the supplemental reservoir is not drawn upon in service applications, it will frequently happen at the end of a long train that, after the triple valve has moved to release position, the back flow of air from the supplemental reservoir to the slide valve chamber will tend to raise the pressure within the slide valve chamber at a rate faster than the rise of brake pipe pressure. The normal effect of this is to cause the valve to creep toward service position, and, since the valve mechanism above described is of the type in which motion of the controlling valve 41 without motion of the slide valve 39 will establish a quick service vent by way of ports 69, 82, 86, 84, 83, and 75, there is serious danger that the triple valve will move to quick service position and produce a reapplication of the brakes.

The detent roller 47 precludes this in a manner which is clearly shown in Fig. 7. The roller 47 by engaging the notch 48 offers substantial resistance to the motion of valve 41 relatively to the slide valve 39. Consequently, when the stem 36 moves far enough to pick up the valve 41, it meets a decided resistance to further motion, but just as or slightly before it reaches this position, the graduating valve 42 blanks the port 88 and consequently terminates the back-flow from the supplemental reservoir. Subsequent rise of brake pipe pressure will shift the triple piston and the valve 42 sufficiently to open the port 88 partially, and, in this way, the back-flow from the supplemental reservoir is kept within limits which will not result in reapplication.

*Service application*

When a service reduction of brake pipe pressure is made, the triple piston moves far enough to overpower the light graduating spring 32, and the parts assume the position shown in Fig. 8 in which quick service flow is permitted by way of ports 69, 81, 82, 86, 84, 83 and 75. This flow may continue until terminated by closure of the limiting valve 66. Service flow to the brake cylinder is by way of ports 87 and 77.

The roller 47 has risen out of the groove 48, and as soon as it rises out of the groove, it offers slight resistance to motion of the valve 41. The valve remains in service position until the reduction of auxiliary reservoir pressure is such as to cause the triple piston to move inward under the urge of predominating brake pipe pressure.

The valve 42 moves to the right relatively to valve 39 and closes the service port. Slightly before the graduating valve 42 closes the port 87, the controlling valve 41 will have been picked up by stem 36 and shifted far enough for roller 47 to reach the edge of groove 48. When this happens, the roller snaps into the groove, and the parts assume service lap position, shown in Fig. 9.

*Service lap position*

In service lap position, the quick service controlling valve 41 is impositively held in its right hand (closed) position, and the lost motion between the valve 41 and stem 36 is sufficient to permit the valve 42 to move far enough to graduate the port 87.

With the valve as illustrated in Fig. 1, it is contemplated that there will be an emergency position in which both graduating springs are overpowered and the triple piston seated against the gasket 29. Emergency position is not involved in the present invention, and hence, need not be discussed in detail. Suffice it to say that in emergency position the slide valve 39 moves beyond the supplemental reservoir port 79, connecting the supplemental and auxiliary reservoirs.

In this emergency position, an emergency port of ordinary type (omitted from the drawings to avoid unnecessary complication) is formed in the slide valve and opens communication from the slide valve chamber to the brake cylinder port 77.

The detent mechanism is not involved in the emergency function, but does not preclude its use. The valve chosen for illustration does not include any arrangement for restricted recharge and retarded release, but the use of the invention does not preclude the use of these features and they may be incorporated according to conventional methods if desired. The use of a graduating valve and a separate quick service controlling valve is not claimed herein broadly, but forms the subject matter of my prior application Serial Number 639,707, filed October 26, 1932.

It is not necessary to use two separate graduating valves, nor is it necessary that the detent roller cooperate with a notch. It might merely cooperate with an inclined shoulder connecting two offset plane surfaces. This construction is shown in Figs. 10-13, and such a shouldered construction might be used in the structure of Figs. 1-9 for the reason that the detent action of the roller in those figures is strictly uni-directional.

Referring now to Figs. 10-13, the stem of the triple piston is indicated at 136, the guiding spider at 137, and the collar at 138. The slide valve chamber bushing appears at 125 and the slide valve at 139. The single graduating valve is indicated at 141. The quick service port is shown at 169, the exhaust port at 175, the brake cylinder port at 177, and the supplemental reservoir port at 179.

The slide valve has a cavity 181 in its lower face with an extension port 182. It also has an exhaust cavity 183 in its lower face with an extension port 184. All the parts so far described conform substantially in arrangement to the corresponding parts in Figs. 6–9. The reference numerals are increased by 100 to indicate that the parts are similar but not identical.

The graduating valve 141 has a recess 186, which, in the left hand position of valve 141 relatively to slide valve 139, bridges the ports 182 and 184. The slide valve 139 has a service port 187 which is graduated by the inner (right hand) end of the graduating valve 141, and a supplemental reservoir port 188 which is graduated by the outer (left hand) end of the valve 141. The valve 141 has little or no lost motion relatively to stem 136.

It is formed with a shoulder 148 designated to coact with a roller 147, which last is resiliently mounted on the slide valve in the manner described with reference to Figs. 2–5, inclusive. The shoulder 148 forms an inclined offset between two plane surfaces parallel with the lower face of the valve 141 so that definite resistance is offered to the outward motion of valve 141. The shoulder is so located that this resistance is offered just prior to the arrival of valve 141 in a position in which the cavity 186 would connect the ports 182 and 184. It will be obvious that the shoulder causes the detent to resist motion in only one direction and to offer resistance only through a relatively short range of motion.

OPERATION

Release position

In the release position shown in Fig. 10, the quick service ports are disconnected and the supplemental reservoir port 188 is open. If the triple valve should start to creep toward application position after release, as might happen at the end of a long train under circumstances already explained, the graduating valve 141 would be moved far enough to blank supplemental reservoir port 188, but would be arrested before a quick service venting connection is established. Such a position is shown in Fig. 11.

Service position (Fig. 12)

Upon a service reduction of brake pipe pressure, the detent would be overpowered and the parts would move to the service position shown in Fig. 12. Here the service port 187 registers with the brake cylinder port 177 and is exposed by the graduating valve 141. Cavity 186 bridges ports 182 and 184 so that quick service flow occurs and may continue until terminated by the quick service limiting valve. When auxiliary reservoir pressure is reduced sufficiently by flow to the brake cylinder, dominating brake pipe pressure will shift the triple valve back to service lap position.

Service lap position (Fig. 13)

The shift to service lap position involves motion of the graduating valve 141 alone. This motion is assisted by the roller 147 as it moves down the inclined shoulder 148. On ensuing reductions of brake pipe pressure, the valve 141 will move far enough to expose the service port 187 until arrested by the detent roller 147, and such arrest of motion will occur before the quick service venting connection is re-established.

While I show an atmospheric quick service vent, the utility of the invention is not limited to use with such a vent. It acquires peculiar utility with an atmospheric vent, because of the very pronounced venting action thereof. While I prefer to use a quick service limiting valve in conjunction with such a vent, the utility of the present invention is not dependent strictly on the use of such a quick service limiting valve.

What is claimed is:—

1. The combination of a movable abutment; a slide valve; a second valve coacting with the slide valve, said valves being shiftable differentially by said abutment; and means, independent of the effect of fluid pressure acting on said valves, serving to increase the resistance to relative motion of the valves, through a portion of the range of such relative motion and to restore the normal resistance through a range of subsequent relative motion.

2. The combination of a movable abutment; a slide valve; a second valve coacting with the slide valve, said valves being shiftable differentially by said abutment; and means, independent of the effect of fluid pressure acting on said valves, serving to increase the resistance to relative motion of the valves, at the initiation of such relative motion and then after limited relative motion serving to restore the normal resistance.

3. The combination of a movable abutment; a slide valve; a second valve coacting with the slide valve, said valves being shiftable differentially by said abutment; and an impositive detent reacting between said valves.

4. The combination of a movable abutment; a slide valve; a second valve coacting with the slide valve, said valves being shiftable differentially by said abutment; and an impositive detent reacting between said valves and effective at one limit of their relative motion.

5. The combination of a movable abutment; a slide valve; a second valve coacting with the slide valve, said valves being shiftable differentially by said abutment; and an impositive detent reacting between said valves and effective at an intermediate point in their relative motion.

6. The combination of a movable abutment; a slide valve; a second valve coacting with the slide valve, said valves being shiftable differentially by said abutment; and an impositive detent reacting between said valves and, when effective, resisting relative motion in both directions.

7. The combination of a movable abutment; a slide valve; a second valve coacting with the slide valve, said valves being shiftable differentially by said abutment; and an impositive detent reacting between said valves and, when effective resisting relative motion in one direction only.

8. The combination of a movable abutment; a slide valve; a second valve coacting with the slide valve, said valves being shiftable differentially by said abutment; and an impositive detent reacting between said valves and comprising a spring mounted on one valve and a rolling member pressed thereby into a recess formed in the other valve.

9. The combination of a movable abutment; a slide valve; a second slide valve coacting with the first slide valve, said valves being shiftable differentially by said abutment; and an impositive detent reacting between said valves and comprising a spring mounted on one valve and a rolling member pressed thereby into a recess formed in the other valve, said spring serving also to urge said valves into sealing engagement with each other.

10. The combination of a movable abutment; a slide valve; a second slide valve seated on the first, said valves being shiftable differentially by said abutment; and spring means urging said valves into sealing engagement with one another and including means for increasing the resistance to relative motion of the valves at a definite point in such relative motion.

11. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and means independent of fluid pressure, serving to resist initially such motion of the graduating valve.

12. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and means reacting directly between said valves and serving to resist initially such motion of the graduating valve.

13. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and an impositive detent reacting between such valves and tending to resist initial motion of the graduating valve from a position in which it closes said vent passage.

14. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and an impositive detent reacting between such valves and serving to resist motion of the graduating valve to the position in which it opens said vent passage.

15. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and an impositive detent reacting between such valves and serving to resist motion of the graduating valve to the position in which it opens said vent passage and to assist motion thereof to a closing position.

16. A triple valve comprising in combination a slide valve; a graduating valve coacting therewith; a triple piston arranged to shift said valves differentially, said valves being so ported that motion of the graduating valve, while the slide valve remains at rest, opens a quick service vent passage; and an impositive detent comprising an inclined cam on one of said valves and a spring urged follower carried by the other and coacting with the cam, the parts being so arranged as to resist motion to vent-open position and to terminate such resistance as the valve arrives substantially in vent-open position.

17. In a valve structure for triple valves, the combination of a slide valve; a graduating valve slidable on said slide valve and having on its back a detent shoulder; and a resilient detent and valve seating spring structure supported by said slide valve and having a portion bearing on the back of the graduating valve in position to coact with said shoulder.

18. In a valve structure for triple valves, the combination of a slide valve; a graduating valve slidable on said slide valve and having on its back a detent shoulder; a resilient member supported by said slide valve; and a roller carried by said resilient member and bearing on the back of said graduating valve to seat the valve, and in position to coact with said shoulder, as the graduating valve moves relatively to the slide valve.

19. In a valve structure for triple valves, the combination of a slide valve; a graduating valve slidable on the slide valve and having on its back a detent shoulder; a bail-like member connected to said slide valve by coil portions and overlying said graduating valve; and a roller carried by said bail-like member and pressed thereby against the back of said graduating valve in position to coact with said detent shoulder.

20. In a valve structure for triple valves, the combination of a slide valve having upstanding members formed with projecting lugs; a graduating valve slidable on the slide valve and having on its back a detent shoulder; a bail-like member having spring loops which engage certain of said lugs and end portions which engage others of said lugs, said bail-like member overlying said graduating valves; and a roller carried by said bail-like member and pressed thereby against the back of said graduating valve in position to coact with said detent shoulder.

21. A brake valve for use with a brake pipe and auxiliary and supplemental reservoirs, comprising in combination, a slide valve; graduating means coacting with said slide valve; a movable abutment arranged to be controlled by the differential of pressures in brake pipe and auxiliary reservoir and arranged to shift said slide valve and graduating means differentially, said graduating means opening connection between said reservoirs in one position relatively to the slide valve, and upon initial motion from such position, while the slide valve remains at rest, first closing such connection and then opening a quick service vent connection from the brake pipe; means operating independently of the action of fluid pressure for impositively arresting such motion of said graduating means after the supplemental reservoir connection is closed and before the quick service vent connection is open; and means serving to render the impositive arresting means inactive when overpowered.

22. A brake valve for use with a brake pipe and auxiliary and supplemental reservoirs, comprising in combination, a slide valve; graduating means coacting with said slide valve; a movable abutment arranged to be controlled by the differential of pressures in brake pipe and auxiliary reservoir and arranged to shift said slide valve and graduating means differentially, said graduating means opening connection between said reservoirs in one position relatively to the slide valve, and upon initial motion from such position, while the slide valve remains at rest, first closing such connection and then opening a quick service vent connection from the brake pipe; and an impositive detent reacting between the slide valve and said graduating means for impositively arresting such motion of the graduating means after the supplemental reservoir connection is closed and before the quick service vent connection is open.

23. The combination of a main valve and two auxiliary valves; means for shifting said valves differentially comprising a movable member having different degrees of lost motion relatively to said valves; and an impositive detent serving to resist the shifting motion of one of said auxiliary valves, whereby such auxiliary valve serves as an impositive stop for the motion of the other auxiliary valve.

24. The combination of a main valve and two auxaliary valves; means for shifting said valves differentially comprising a movable member having different degrees of lost motion relatively to said valves; and an impositive detent reacting between the main valve and one of said auxiliary valves, such auxiliary valve, when arrested by such detent, serving impositively to limit the motion of the other auxiliary valve.

25. A triple valve comprising in combination a slide valve; a graduating valve coacting therewith; a triple piston arranged to shift said valves differentially, said valves being so ported that motion of the graduating valve, while the slide valve remains at rest, opens a quick service vent passage leading to atmosphere; means responsive to a definite reduction of brake pipe pressure for closing said quick service passage; and detent means serving to resist initially such motion of the graduating valve.

26. A triple valve comprising in combination a slide valve; a graduating valve coacting therewith; a triple piston arranged to shift said valves differentially, said valves being so ported that motion of the graduating valve, while the slide valve remains at rest, opens a quick service vent passage leading to atmosphere; means responsive to a definite reduction of brake pipe pressure for closing said quick service passage; and detent means reacting between said valves and serving to resist initially such motion of the graduating valve.

27. A triple valve comprising in combination a slide valve; a graduating valve coacting therewith; a triple piston arranged to shift said valves differentially, said valves being so ported that the slide valve establishes, in both release and service position, quick service ports which are connected by a port in the graduating valve in one position of the graduating valve and disconnected in another position of the graduating valve; and an impositive detent reacting between said valves and serving to resist motion of the graduating valve to said connecting position.

28. The combination defined in claim 27 in which the slide valve is provided with a reservoir charging port and with a service port, said ports being graduated by said graduating valve while said quick service ports are disconnected by the graduating valve.

29. A triple valve comprising in combination a slide valve; two graduating valves coacting therewith; a triple piston arranged to shift said three valves differentially, said slide valve and one of said graduating valves being ported to control quick service venting flow, said slide valve and the other of said graduating valves being arranged to control service flow to the brake cylinder and charging flow to a reservoir; and an impositive detent reacting between the first-named of said graduating valves and said slide valve and serving to resist motion thereof to quick service venting position.

30. In a triple valve, the combination of a slide valve and a graduating valve having a normal range of relative motion in which the graduating valve performs its normal graduating functions but capable of further relative movement; a quick service controlling valve shiftable relatively to the slide valve to establish a quick service venting connection; and an impositive detent reacting between said slide valve and said quick service controlling valve and resisting motion of the quick service controlling valve to its quick service venting position, said controlling valve, when arrested by said detent, limiting the motion of the graduating valve to its normal range.

31. The combination defined in claim 30 in which the quick service venting flow is to atmosphere, and means, responsive to a definite reduction of brake pipe pressure, are provided to terminate such flow.

CHARLES A. CAMPBELL.